(12) United States Patent
Georgeson et al.

(10) Patent No.: US 11,292,208 B2
(45) Date of Patent: Apr. 5, 2022

(54) CUTTING WIRE FOR REMOVAL OF EXPANDED MATERIAL AFTER CURING OF A COMPOSITE PART

(71) Applicant: The Boeing Company, Chicago, IL (US)

(72) Inventors: Gary E. Georgeson, Tacoma, WA (US); Xiaoxi Wang, Mukilteo, WA (US); Jonathan Santiago, Seattle, WA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 16/448,576

(22) Filed: Jun. 21, 2019

(65) Prior Publication Data

US 2020/0398500 A1    Dec. 24, 2020

(51) Int. Cl.
*B29C 65/00* (2006.01)
*B29C 45/72* (2006.01)

(52) U.S. Cl.
CPC ...... *B29C 66/0326* (2013.01); *B29C 45/7207* (2013.01); *B29C 66/727* (2013.01); *B29C 66/816* (2013.01)

(58) Field of Classification Search
CPC . B29C 66/0326; B29C 66/816; B29C 66/727; B29C 45/7207; B29C 70/54; B29C 70/545; B29C 70/446; B29C 66/72141; B29C 66/7212; B29C 66/73941; B29C 66/116; B29C 65/02; B29C 66/73752; B29C 66/5346; B29C 66/112; B29C 66/634; B29C 33/485; B29C 70/342; B29C 70/44; B64F 5/10; B64C 1/00; B64C 2001/0072; B29L 2031/3076
See application file for complete search history.

(56) References Cited

U.S. PATENT DOCUMENTS

| 3,788,178 A * | 1/1974 | Pantel ................. B29C 44/5654 83/171 |
| 2002/0166595 A1 * | 11/2002 | Lindsay ................. A63B 60/00 138/153 |
| 2011/0308711 A1 * | 12/2011 | Coleman ............... B29C 70/443 156/189 |

OTHER PUBLICATIONS

U.S. Appl. No. 16/053,733, filed Aug. 2, 2018.
U.S. Appl. No. 16/237,912, filed Jan. 2, 2019.

* cited by examiner

*Primary Examiner* — Jacob T Minskey
*Assistant Examiner* — S. Behrooz Ghorishi
(74) *Attorney, Agent, or Firm* — Duft & Bornsen, PC (57) ABSTRACT

Composite fabrication system and associated methods. In one embodiment, a composite fabrication system comprises a molding tool that includes a forming surface at least partially disposed within a constrained space, and a foamable material that expands inside of the constrained space to form an expanded material that presses a layup of one or more composite layers against the molding tool. The composite fabrication system further comprises a curing device configured to cure the layup to form a composite part, and a cutting wire embedded in the constrained space that is heated and configured to cut the expanded material into pieces that are removable from the constrained space.

20 Claims, 11 Drawing Sheets

CUTTING WIRE FOR REMOVAL OF EXPANDED MATERIAL AFTER CURING OF A COMPOSITE PART

FIELD

This disclosure relates to the field of manufacturing, and more particularly, to manufacturing of composite parts.

BACKGROUND

Composite parts built from alternating layers of reinforcement fibers are high strength and light weight, and are commonly used in aerospace industries, automotive industries, and the like. Composite parts are generally prepared by laying up a number of reinforcement fibers or fabrics into a stack, with the fibers of the adjacent layers running at different angles. A prepreg is a term used for reinforcement fibers that are immersed or pre-impregnated with a matrix material or resin. The impregnated reinforcement fibers are laid-up or formed into the shape of the desired composite part in or on a mold, and then heated to cure the matrix material and provide the finished composite part.

It is beneficial to evenly clamp one or more composite layers (e.g., prepreg layers) against a mold so that the composite layers accurately conform to the forming surface during cure. For many of the desired shapes of composite parts, external tooling may be used to clamp the composite layers to the mold, such as vacuum bagging. As the desired shapes of the composite parts get more complex, vacuum bagging and the like may not be effective to clamp the composite layers to a mold.

SUMMARY

Provided herein are a composite fabrication system and associated methods for fabricating composite parts. The composite fabrication system uses expandable tooling to clamp composite layers to a molding tool from within a constrained space. The expandable tooling comprises a foamable material that is configured to expand into an expanded material within the constrained space, and press the composite layers against the forming surface(s) of the molding tool for curing. After curing, the expanded material may be difficult to remove from the constrained space. Thus, a cutting wire is used in the embodiments herein as a hot knife to cut the expanded material into pieces that may be removed from the constrained space. Use of the cutting wire is beneficial in that the expanded material may be easily removed from the composite part and/or the molding tool after curing so that foamable materials may be used in composite fabrication for a variety of applications.

One embodiment comprises a method of fabricating a composite part. The method comprises placing one or more composite layers on a molding tool to form a layup where at least a portion of the layup is within a constrained space. The method further comprises inserting a foamable material in the constrained space, embedding a cutting wire in the constrained space before curing, activating the foamable material to expand into an expanded material within the constrained space, and curing the layup while the expanded material presses the layup against the molding tool to form the composite part. The method further comprises heating the cutting wire after curing, moving the cutting wire to cut the expanded material into pieces, and removing the pieces from the constrained space.

In another embodiment, activating the foamable material comprises heating the foamable material.

In another embodiment, heating the cutting wire comprises applying a current through the cutting wire.

In another embodiment, moving the cutting wire comprises moving the cutting wire from one side of the constrained space to another with a manipulator.

Another embodiment comprises a method of fabricating a composite part. The method comprises placing one or more composite layers on a molding tool to form a layup where at least a portion of the layup is within a constrained space. The method further comprises inserting a foamable material in the constrained space, activating the foamable material to expand into an expanded material within the constrained space, and curing the layup while the expanded material presses the layup against the molding tool to form the composite part. The method further comprises boring a hole through the expanded material after curing, threading a cutting wire through the hole in the expanded material, heating the cutting wire, moving the cutting wire to cut the expanded material into pieces, and removing the pieces from the constrained space.

In another embodiment, boring a hole through the expanded material comprises boring the hole with a heated bit that extends through the expanded material.

Another embodiment comprises a composite fabrication system configured to form a composite part. The composite fabrication system comprises a molding tool that includes a forming surface where at least a portion of the forming surface is disposed within a constrained space. The composite fabrication system further comprises a foamable material configured to expand inside of the constrained space to form an expanded material that presses a layup of one or more composite layers against the molding tool. The composite fabrication system further comprises a curing device configured to cure the layup to form a composite part as the expanded material presses the layup against the molding tool, and a cutting wire embedded in the constrained space that is heated and configured to cut the expanded material into pieces that are removable from the constrained space.

In another embodiment, the cutting wire is embedded in the constrained space prior to curing.

In another embodiment, the composite fabrication system further comprises a manipulator configured to move the cutting wire to cut the expanded material into the pieces.

In another embodiment, the composite fabrication system further comprises a power supply configured to apply a current through the cutting wire to heat the cutting wire for cutting the expanded material.

In another embodiment, the foamable material comprises foamable pellets.

In another embodiment, the composite fabrication system further comprises a drill configured to bore a hole through the expanded material after curing, where the cutting wire is threaded through the hole.

In another embodiment, the drill is configured to bore the hole with a heated bit that extends through the expanded material.

In another embodiment, the drill is configured to bore the hole with a rotating bit.

In another embodiment, the composite part is manufactured for an aircraft.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

In forming composite parts or composite materials, composite layers of reinforcement fibers (also referred to as laminate plies) impregnated with a resin are laid-up on a molding tool. It is desirable to evenly press the composite layers against the forming surface(s) of the molding tool so that the composite layers accurately conform to the forming surface(s). When the forming surface is accessible, a vacuum bag or another external-type of tool may be used to press the composite layers against the forming surface. The vacuum bag is placed over the composite layers and sealed to the molding tool so that the composite layers are sealed within an airtight envelope between the vacuum bag and the molding tool. A vacuum pump evacuates air from the inside of the envelope, and atmospheric pressure forces the sides of the envelope and everything within the envelope together, which puts equal and even pressure over the surface of the envelope. The vacuum bag therefore evenly clamps the composite layers against the forming surface of the molding tool for curing in an oven, an autoclave, or the like.

There may be situations where the shape of the molding tool does not lend well to vacuum bagging or other techniques for clamping the composite layers to the molding tool. For example, the molding tool may have a custom or complex shape that is enclosed on multiple sides, which makes vacuum bagging or other techniques difficult or impossible. In the embodiments described herein, clamping force is provided by expandable tooling that presses the composite layers against the molding tool from inside of a constrained space.

Figure 1:
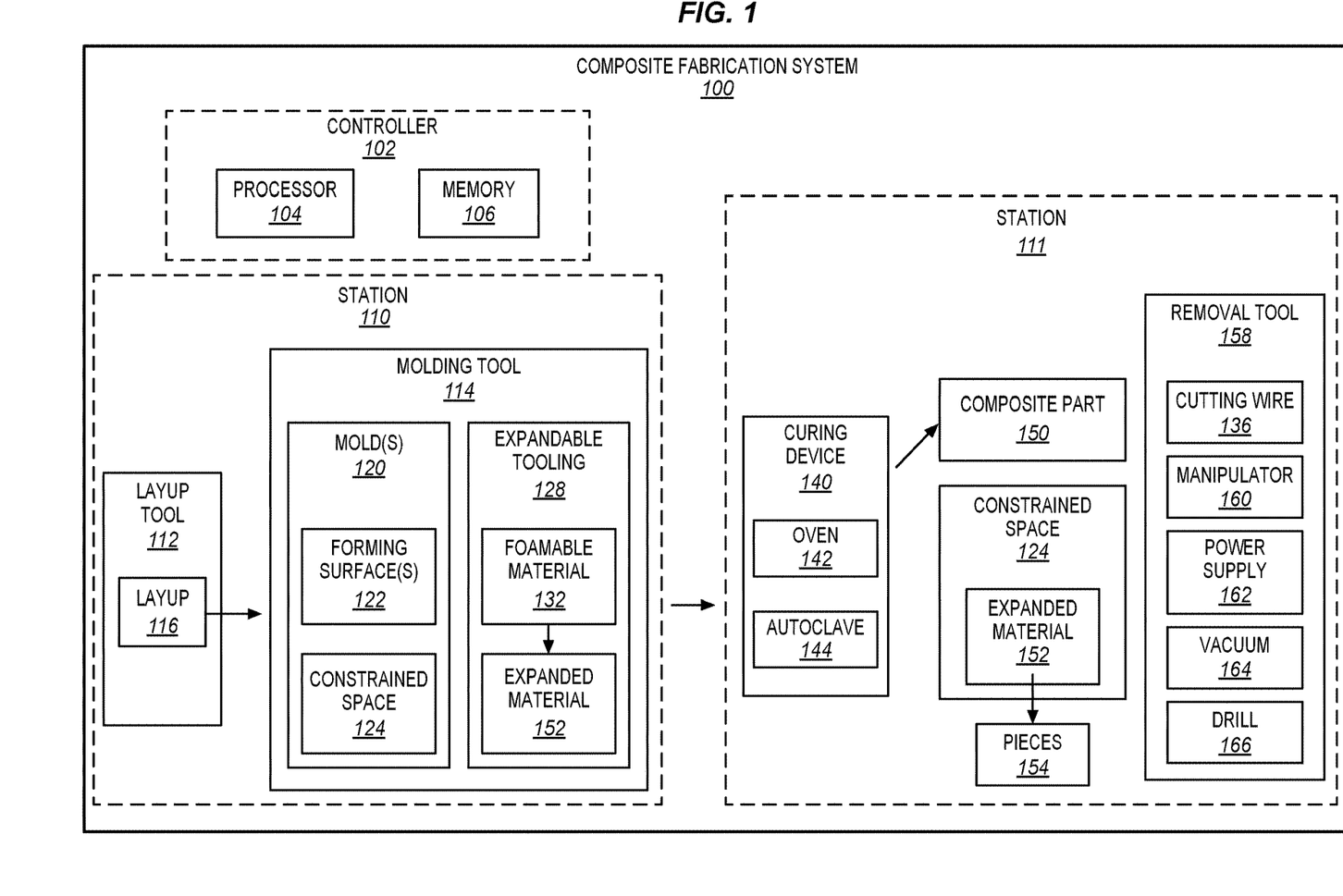
FIG. 1 is schematic diagram of a composite fabrication system in an illustrative embodiment.

FIG. 1 is schematic diagram of a composite fabrication system 100 in an illustrative embodiment. Composite fabrication system 100 is configured to form one or more composite parts, such as Carbon Fiber Reinforced Polymer (CFRP) parts. Composite fabrication system 100 includes a controller 102 that is configured to manage the operations for one or more stations 110-111. Controller 102 may be implemented on a hardware platform comprised of a processor 104 that executes instructions stored in memory 106 as shown in FIG. 1. A processor 104 comprises an integrated hardware circuit configured to execute instructions, and memory 106 is a non-transitory computer readable storage medium for data, instructions, applications, etc., and is accessible by processor 104. Although not shown in FIG. 1, controller 102 may be implemented on a hardware platform comprised of analog circuitry, digital circuitry, or a combination of the two.

Stations 110-111 represent various stages of fabricating a composite part, and may include a variety of fabrication equipment. Tasks performed at stations 110-111 may be automated, may be manual, or may be a combination of automated tasks and manual tasks. In this embodiment, station 110 includes layup tool 112 and a molding tool 114. Layup tool 112 is configured to stack one or more composite layers to form a layup 116 or multiple layups 116. A composite layer is comprised of a reinforcement constituent, which provides strength for the composite part, and a resin (thermoset or thermoplastic). The reinforcement constituent may comprise unidirectional fibers (e.g., carbon, glass, aluminum, steel, titanium, etc.), a fabric, etc. Layup tool 112 may stack the composite layers directly onto molding tool 114, or stack the composite layers on an intermediate medium and transfer layup 116 to molding tool 114. Layup tool 112 may include a cutting device configured to cut the composite layers to a desired size, and a stacking device configured to stack the composite layers in a particular order to create layup 116. Layup tool 112 may also knit, weave, or otherwise connect the composite layers within layup 116.

Figure 2:
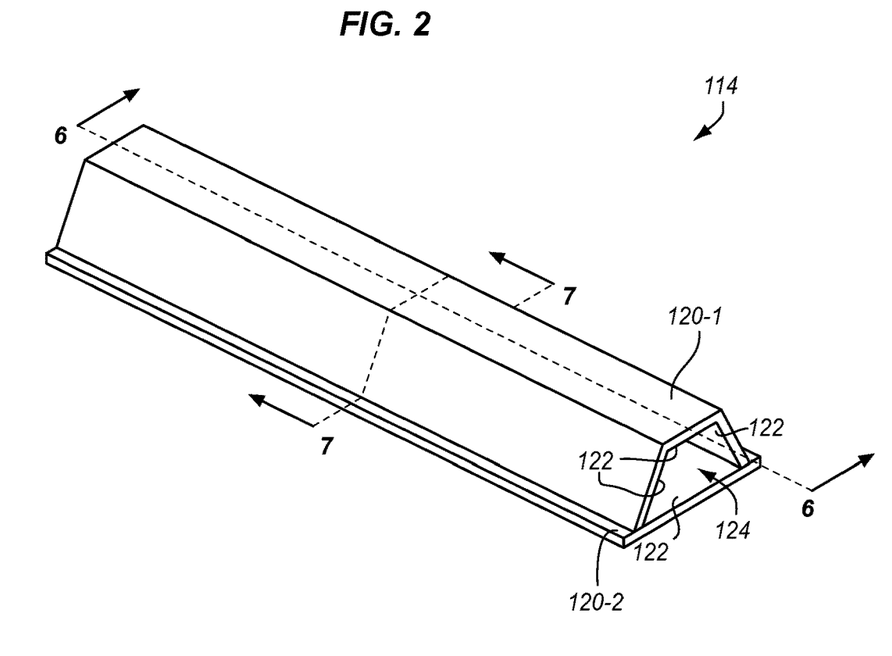
FIGS. 2-3 are perspective views of molding tools in illustrative embodiments.
Figure 3:
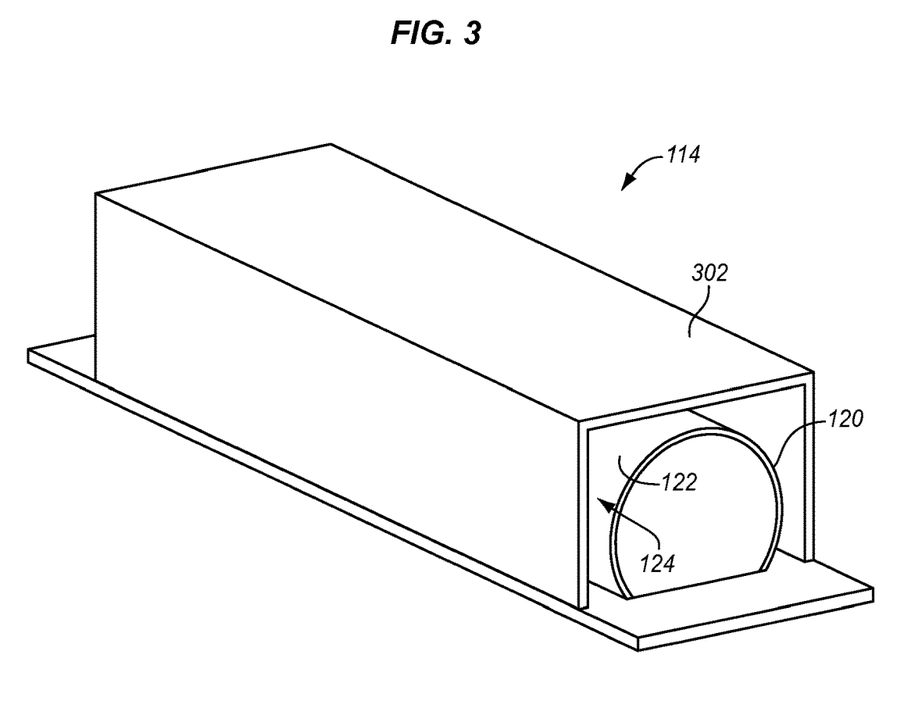

Molding tool 114 includes one or more molds 120 (also referred to as dies) made from a rigid material, such as iron, steel, aluminum, etc. A mold 120 is a tool or device that imparts a desired shape, form, or finish to a material. Thus, a mold 120 has one or more forming surfaces 122 that impart a desired shape to layup 116. Forming surface(s) 122 may be polished, cleaned, coated with a release agent, or further prepped for a fabrication process. It is assumed in this embodiment that the forming surface(s) 122 of molds 120 define a complex shape for layup 116. It is also assumed that molding tool 114 includes a constrained space 124 that at least partially encloses one or more of the forming surfaces 122. For example, a constrained space 124 may comprise a cavity or another type of surface feature in or on the forming surface(s) 122. In another example, a constrained space 124 may comprise an internal volume between the forming surface(s) 122, and a box, container, etc., that is placed on or around molding tool 114. FIGS. 2-3 are perspective views of molding tools 114 in illustrative embodiments. Molding tool 114 in FIG. 2 includes a top mold 120-1 and a bottom mold 120-2 that are arranged together to form a constrained space 124 between molds 120-1/120-2. Layup 116 may be placed within constrained space 124 (see also, FIG. 5), and held against forming surfaces 122 until matrix material in layup 116 has cured. Molding tool 114 in FIG. 3 includes a mold 120 with a cylindrical forming surface 122, which is partially enclosed by container 302 to form a constrained space 124. Layup 116 may be placed within constrained space 124, and held against forming surface 122 until matrix material in layup 116 has cured. Molding tool 114 in FIG. 1 may have a variety of other configurations that define a constrained space 124.

Because of the shape of mold(s) 120, expandable tooling 128 is used to press layup 116 against forming surfaces 122 of molding tool 114 from inside of constrained space 124 during cure. In one embodiment, expandable tooling 128 includes a foamable material 132, which comprises a material that expands, enlarges, swells, etc., in response to a stimulus or trigger condition. For example, foamable material 132 may comprise pellets, beads, etc., that are configured to expand in volume when heated to a predetermined temperature. Foamable pellets may comprise a thermoplastic material, a thermosetting material, and/or any other suitable polymer material, and a foaming agent. The foaming agent, when heated to at least a predetermined temperature, forms a plurality of holes, pockets, or voids within the material of the foamable pellets so that the volume of the pellets increases. In one embodiment, foamable material 132 may be inserted in a bladder, which is an expandable bag or container. When foamable material 132 expands, the walls of the bladder elastically or plastically deform so that the bladder inflates inside of constrained space 124.

Molding tool 114 and layup 116 may be moved to station 111 for curing by a curing device 140. For curing, foamable material 132 is activated to expand inside of constrained space 124 to form an expanded material 152 that presses layup 116 against molding tool 114. Curing device 140 is configured to cure layup 116 as expanded material 152 presses layup 116 against the forming surface(s) 122 of molding tool 114. In one embodiment, curing device 140 is configured to raise the temperature of layup 116 to a curing temperature, which hardens the thermosetting polymers in layup 116 to form a composite part 150. Curing device 140 may comprise an oven 142, an autoclave 144, or another type of device that applies heat to layup 116.

After the curing process, it may be beneficial to remove expanded material 152 from constrained space 124, so station 111 may further include a removal tool 158. Removal tool 158 includes cutting wire 136. Expandable tooling 128 further includes a cutting wire 136, which may be embedded in constrained space 124 prior to curing, or may be inserted through expanded material 152 after curing. Cutting wire 136 is an electrically conductive wire, such as copper, that increases in temperature when conducting a current. Cutting wire 136 is configured to act as a hot knife to remove the expanded material 152 from constrained space 124 after curing. As will be described in more detail below, when foamable material 132 expands into expanded material 152 within constrained space 124, it may be difficult to remove the expanded material 152. Thus, cutting wire 136 may be used after curing to cut the expanded material 152 into pieces 154 that can be removed from constrained space 124.

Removal tool 158 may further include a manipulator 160, which may comprise a robotic arm or the like that is controlled by commands from controller 102. Manipulator 160 may be configured to grasp cutting wire 136, to electrically couple with cutting wire 136, to move cutting wire 136, etc. Removal tool 158 further includes a power supply 162 configured to apply a current through cutting wire 136 to generate heat. Removal tool 158 may further include a vacuum device 164 configured to apply suction to remove the pieces 154 of expanded material 152 from constrained space 124.

Removal tool 158 may further include a drill 166 that is configured to form a hole through expanded material 152. Drill 166 may comprise a device that bores a hole via rotation of a bit or the like. Alternatively, drill 166 may comprise a device that bores a hole with a heated bit that is configured to extend through the expanded material 152. Drill 166 may be used, for instance, when cutting wire 136 is not embedded in constrained space 124 prior to cure. When layup 116 is cured and foamable material 132 transforms into its expanded state, drill 166 may be used to form a hole through the expanded material 152 (e.g., from one side to another). Cutting wire 136 may then be threaded or strung through the hole in the expanded material 152, such as with manipulator 160.

Composite fabrication system 100 may include other stations and systems used to fabricate composite part 150 that are not shown for the sake of brevity.

Figure 4:
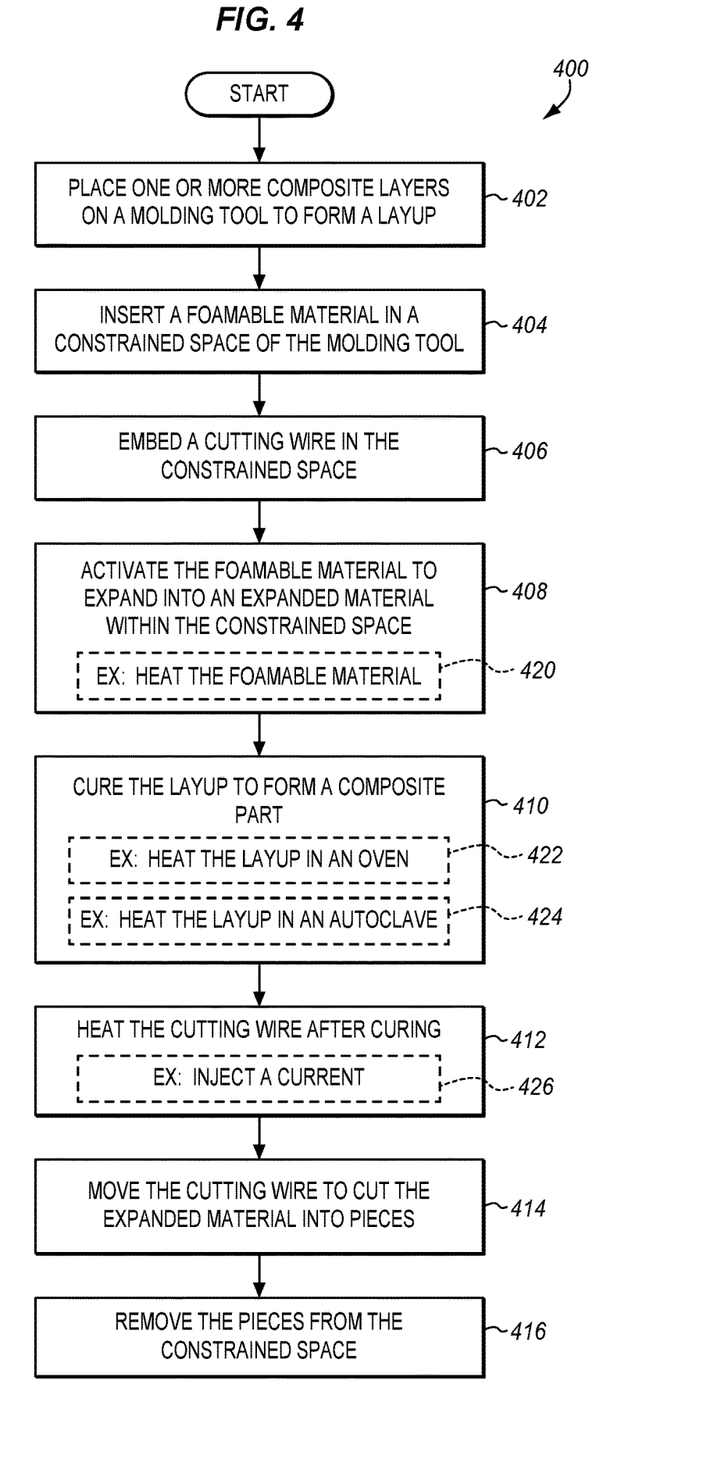
FIG. 4 is a flow chart illustrating a method of fabricating a composite part in an illustrative embodiment.

FIG. 4 is a flow chart illustrating a method 400 of fabricating a composite part in an illustrative embodiment. The steps of method 400 will be described with respect to composite fabrication system 100 of FIG. 1, although one skilled in the art will understand that the methods described herein may be performed by other types of systems. The steps of the methods described herein are not all inclusive and may include other steps not shown. The steps for the flow charts shown herein may also be performed in an alternative order.

One step of method 400 includes placing one or more composite layers on molding tool 114 to form a layup 116 (step 402). As described above, the shape of molding tool 114, or more particularly, one or more molds 120 of molding tool 114, are complex such that at least a portion of layup 116 is within a constrained space 124. In composite fabrication processes, it may be beneficial to evenly clamp layup 116 to the forming surface(s) 122 of molding tool 114 during cure. When working with complex shapes, expandable tooling 128 may be inserted in constrained space 124 prior to curing, and expanded to clamp layup 116 against molding tool 114 for curing. In this embodiment, expandable tooling 128 comprises a foamable material 132 that is inserted in constrained space 124 (step 404). Layup 116 is therefore disposed between foamable material 132 and molding tool 114 in constrained space 124.

Figure 5:
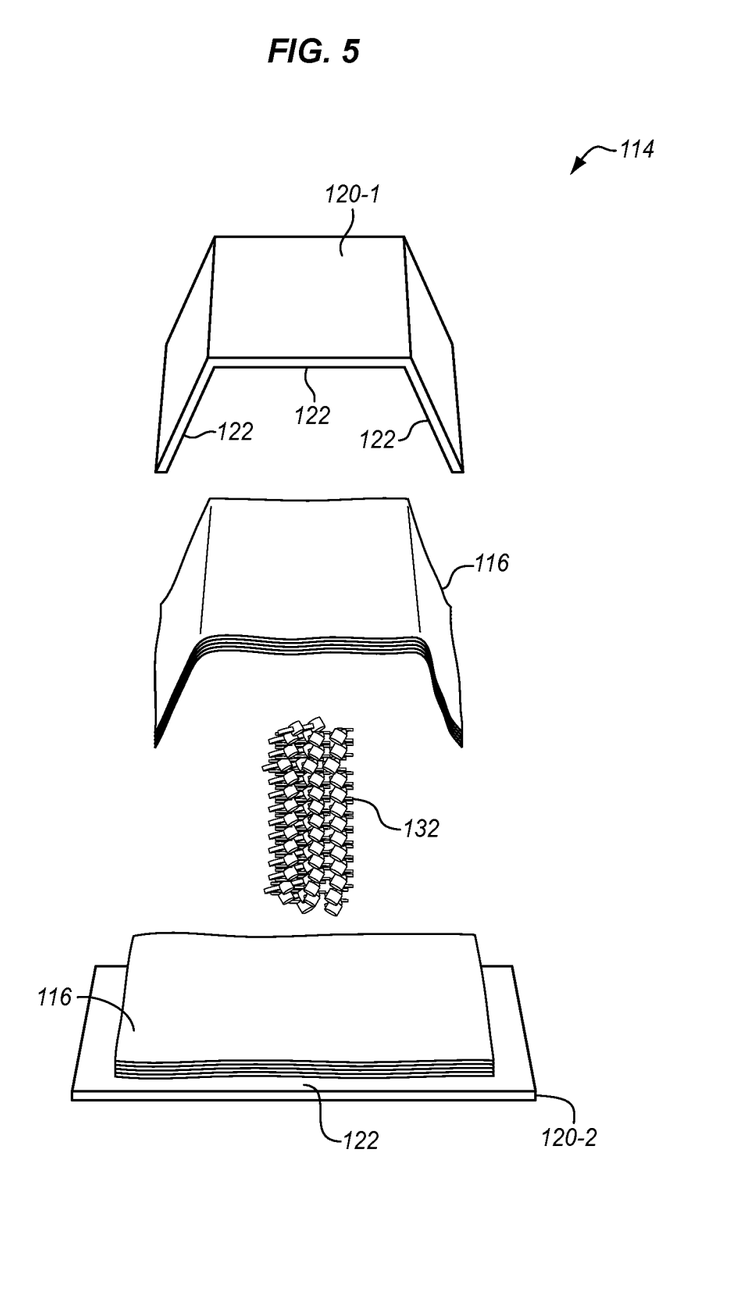
FIG. 5 is an exploded view of a molding tool with a layup and a foamable material in an illustrative embodiment.

FIG. 5 is an exploded view of molding tool 114 with layup 116 and foamable material 132 in an illustrative embodiment. In this embodiment, a portion of layup 116 is placed on mold 120-2, and another portion of layup 116 is placed in mold 120-1. When mold 120-1 is brought into contact with mold 120-2, a constrained space 124 is formed between molds 120-1/120-2 (see FIG. 2) with layup 116 disposed within the constrained space 124. Foamable material 132 is inserted in the constrained space 124, with layup 116 disposed between foamable material 132 and forming surfaces 122 of molds 120-1/120-2.

Figure 6:
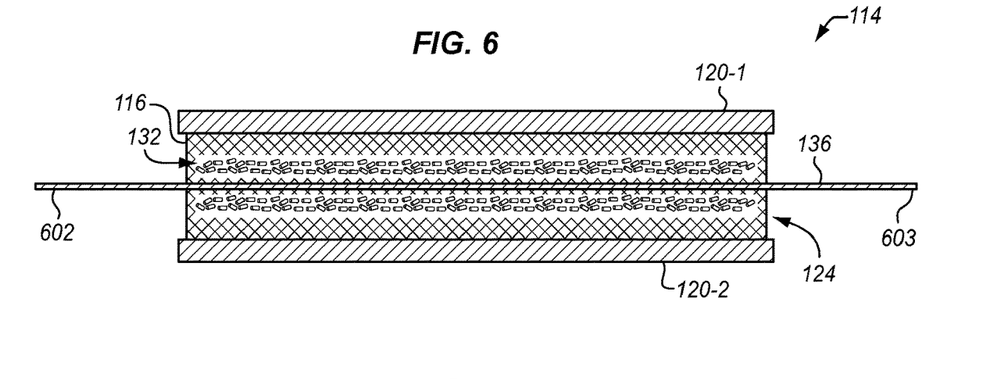
FIGS. 6-7 are cross-sectional views of a molding tool with a cutting wire embedded in a constrained space in an illustrative embodiment.
Figure 7:
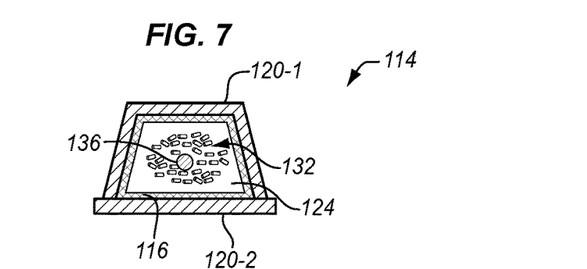

In FIG. 4, method 400 further includes embedding a cutting wire 136 in constrained space 124 (step 406). In this embodiment, cutting wire 136 is embedded in constrained space 124 before curing. FIGS. 6-7 are cross-sectional views of molding tool 114 with cutting wire 136 embedded in constrained space 124 in an illustrative embodiment. The view in FIG. 6 is along cut plane 6-6 in FIG. 2, and the view in FIG. 7 is along cut plane 7-7 in FIG. 2. Cutting wire 136 is disposed within constrained space 124 along with foamable material 132, and ends 602-603 of cutting wire 136 extend out of constrained space 124 and are exposed.

Figure 8:
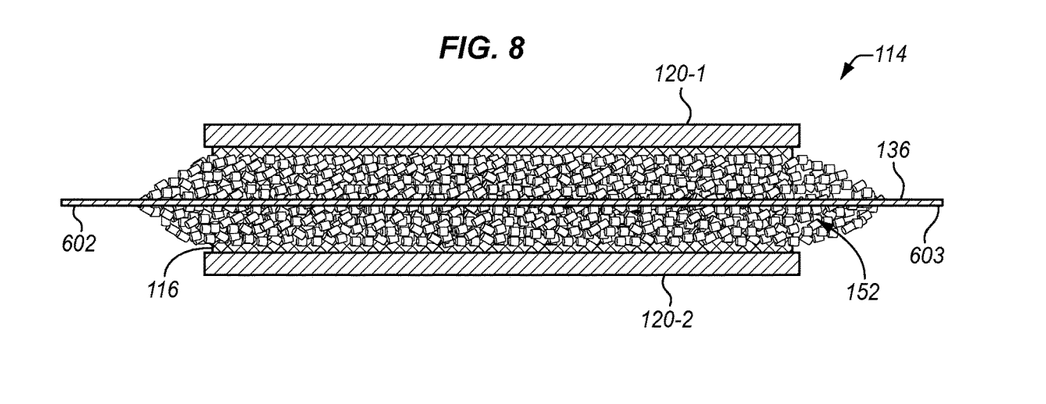
FIGS. 8-9 are cross-sectional views of a molding tool with a foamable material expanded in an illustrative embodiment.
Figure 9:
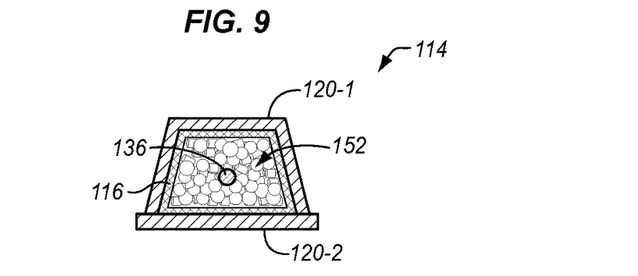

Prior to or concurrent with curing, foamable material 132 is activated to expand into an expanded material 152 within constrained space 124 (step 408). Foamable material 132 may be activated by heat, by a chemical reaction, or by another stimulus or trigger condition. For example, foamable material 132 may be heated (optional step 420) before curing or during curing to cause expansion. FIGS. 8-9 are cross-sectional views of molding tool 114 with foamable material 132 expanded into expanded material 152 in an illustrative embodiment. The view in FIG. 8 is along cut plane 6-6 in FIG. 2, and the view in FIG. 9 is along cut plane 7-7 in FIG. 2. As foamable material 132 expands into expanded material 152, it presses layup 116 against the forming surface(s) 122 of molding tool 114 (see also, FIG. 2) and acts to clamp layup 116 against molding tool 114. Expanded material 152 is designed to hold layup 116 in a specific shape until matrix material in layup 116 has cured.

Method 400 further includes curing the layup 116 while expanded material 152 presses layup 116 against the forming surface(s) 122 of molding tool 114 to form a composite part 150 (step 410). For example, oven 142 may heat layup 116 for curing (optional step 422), autoclave 144 may heat layup 116 for curing (optional step 424), or layup 116 may be cured via application of heat from another source. While being cured, expanded material 152 acts to clamp layup 116 against molding tool 114 so that layup 116 accurately conforms to the forming surface(s) 122 of molding tool 114 when forming composite part 150.

Figure 10:
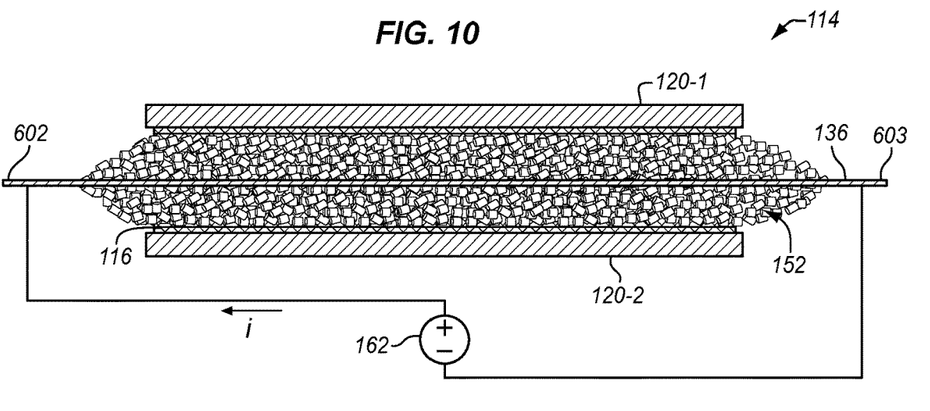
FIG. 10 is a cross-sectional view of a molding tool with a cutting wire being heated in an illustrative embodiment.

After curing, the expanded material 152 may be tightly compacted in constrained space 124 and difficult to remove. For example, curing temperatures may be several hundred degrees, which may act to sinter the expanded material 152 into a hardened mass. Sintering of the expanded material 152 may be beneficial as the surface quality of composite part 150 may be improved and pressure may be more uniform. However, the expanded material 152 when sintered may not be easily removed from constrained space 124. To remove expanded material 152, method 400 includes heating the cutting wire 136 after curing (step 412). For example, power supply 162 may apply a current through cutting wire 136 to increase the temperature of cutting wire (optional step 426). FIG. 10 is a cross-sectional view of molding tool 114 with cutting wire 136 being heated in an illustrative embodiment. The view in FIG. 10 is along cut plane 6-6 in FIG. 2. FIG. 10 illustrates the cutting wire 136 extending through the expanded material 152. When power supply 162 applies a voltage across cutting wire 136 (across ends 602-603), a current is applied through cutting wire 136. Cutting wire 136 has an electrical resistance, and some of the electric energy is converted to thermal energy which causes cutting wire 136 to heat up. Although not shown, manipulator 160 may grasp ends 602-603 of cutting wire 136 with end effectors that make an electrical coupling with cutting wire 136. Power supply 162 may then apply the voltage across cutting wire 136 through the electrical coupling provided by manipulator 160.

Figure 11:
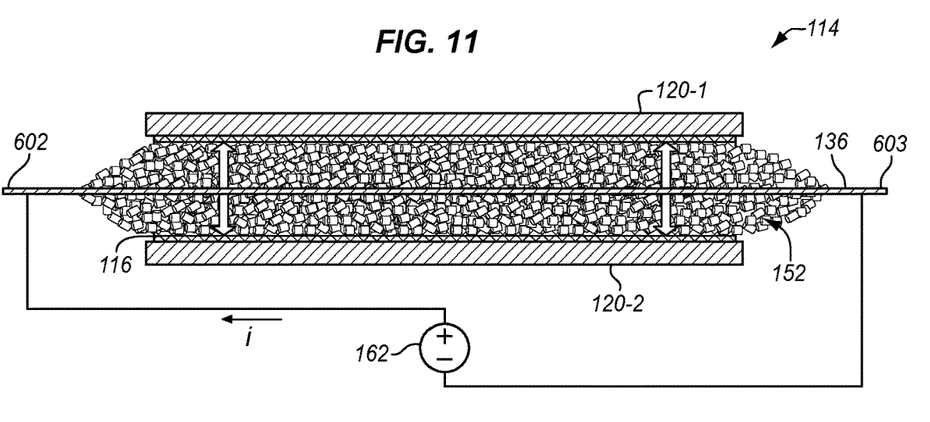
FIGS. 11-14 are cross-sectional views of a molding tool with a cutting wire being moved in illustrative embodiments.
Figure 12:
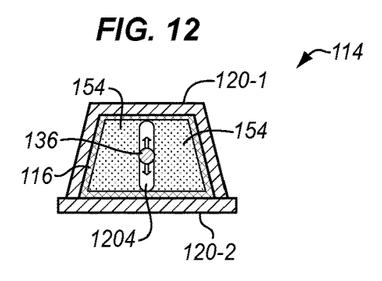
Figure 13:
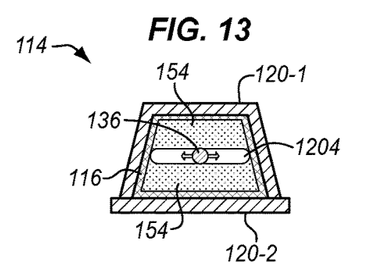
Figure 14:
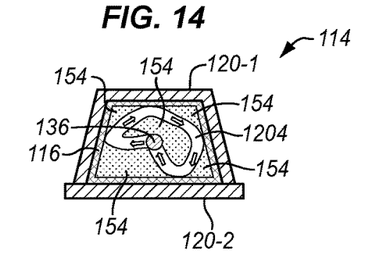

In FIG. 4, method 400 further includes moving cutting wire 136 to cut the expanded material 152 into pieces 154 (step 414). FIGS. 11-14 are cross-sectional views of molding tool 114 with cutting wire 136 being moved in illustrative embodiments. The view in FIG. 11 is along cut plane 6-6 in FIG. 2, and the views in FIGS. 12-14 are along cut plane 7-7 in FIG. 2. Cutting wire 136 may be moved, such as with manipulator 160, from one side of constrained space 124 to another to cut the expanded material 152 into pieces 154. As illustrated in FIG. 12, cutting wire 136 may be moved in an upward and/or downward motion to cut a groove 1204 through the expanded material 152. As illustrated in FIG. 13, cutting wire 136 may be moved in a side-to-side motion to cut a groove 1204 through the expanded material 152. As illustrated in FIG. 14, cutting wire 136 may be moved in a pattern to cut a groove 1204 through the expanded material 152. Therefore, cutting wire 136 is used like a hot knife in this embodiment to cut one or more grooves 1204 into the expanded material 152, and segment it into pieces 154.

In FIG. 4, method 400 further includes removing pieces 154 of the expanded material 152 from constrained space 124 (step 416). For example, manipulator 160 may grasp pieces 154 of the expanded material 152, and pull the pieces 154 from constrained space 124. In another embodiment, vacuum device 164 may apply suction to remove the pieces 154 from constrained space 124. Other techniques may be used to remove the pieces 154 from constrained space 124 so that molding tool 114 and/or composite part 150 are free from remnants of the expandable tooling 128 that was used to form composite part 150.

Figure 15:
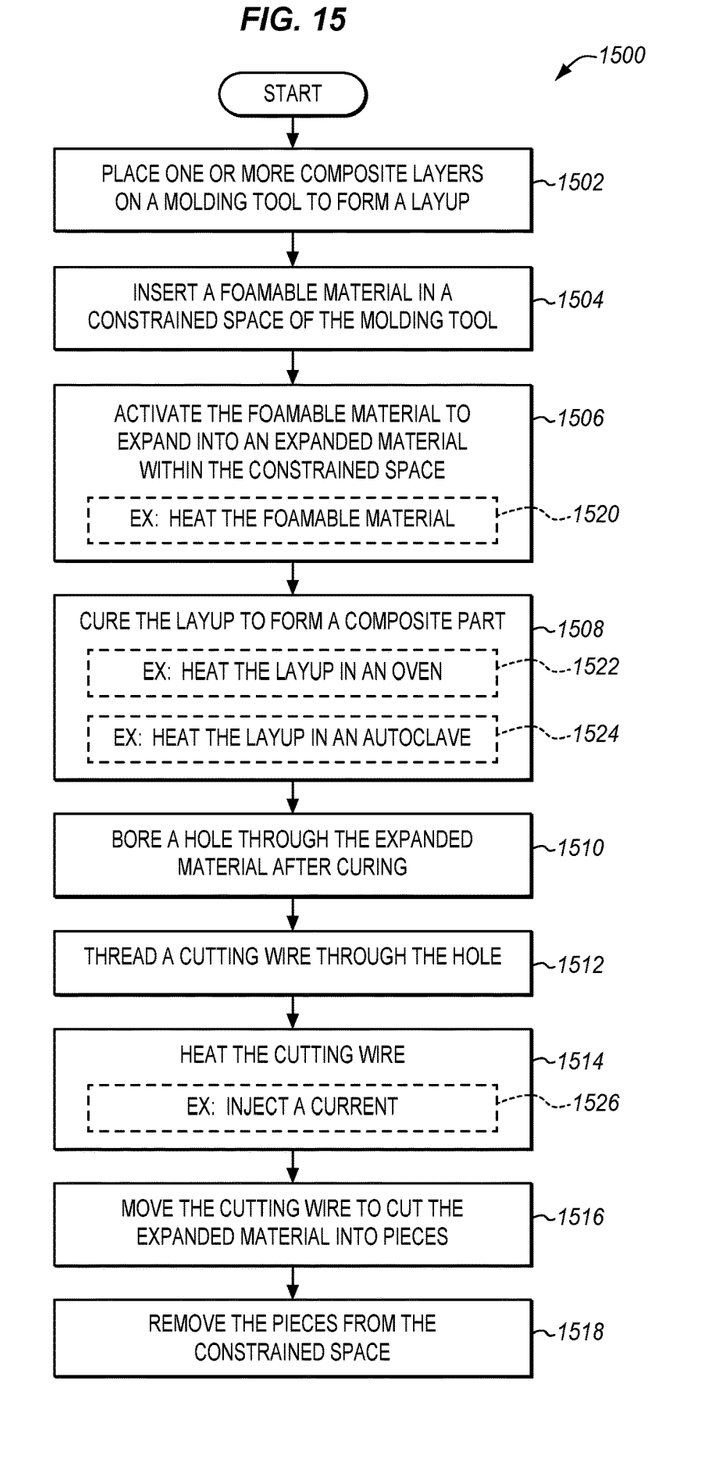
FIG. 15 is a flow chart illustrating another method of fabricating a composite part in an illustrative embodiment.
Figure 16:
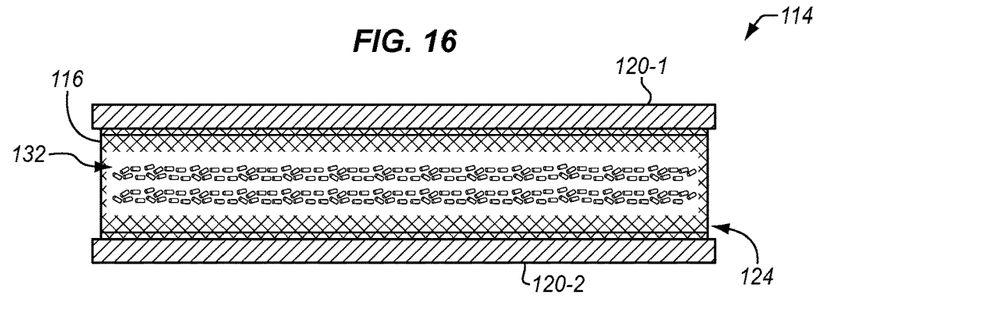
FIGS. 16-17 are cross-sectional views of a molding tool with a foamable material in a constrained space in an illustrative embodiment.
Figure 17:
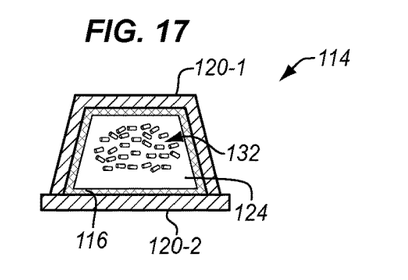

FIG. 15 is a flow chart illustrating another method 1500 of fabricating a composite part in an illustrative embodiment. Method 1500 is similar to method 400 in using a cutting wire 136. However, in this embodiment, cutting wire 136 is inserted in constrained space 124 after curing. As above, method 1500 includes placing one or more composite layers on molding tool 114 to form a layup 116 (step 1502). The shape of molding tool 114 is complex such that at least a portion of layup 116 is within a constrained space 124. Method 1500 further includes inserting a foamable material 132 in constrained space 124 (step 1504). Layup 116 is therefore disposed between foamable material 132 and molding tool 114 in constrained space 124. FIGS. 16-17 are cross-sectional views of molding tool 114 with foamable material 132 inserted in constrained space 124 in an illustrative embodiment. The view in FIG. 16 is along cut plane 6-6 in FIG. 2, and the view in FIG. 17 is along cut plane 7-7 in FIG. 2.

Figure 18:
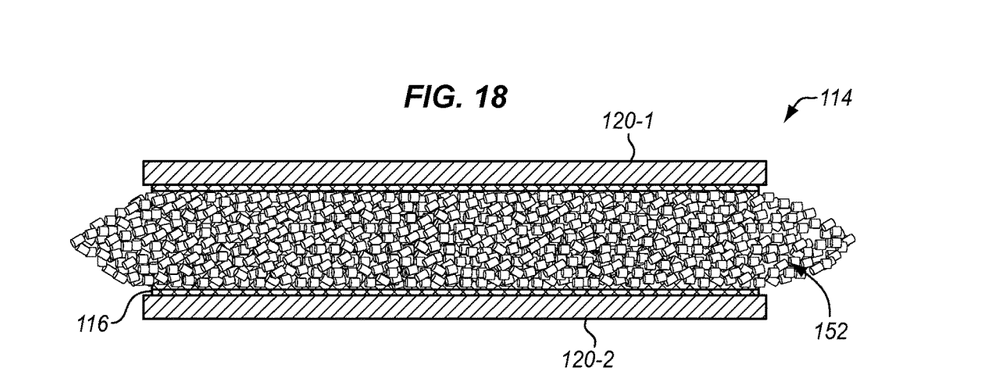
FIGS. 18-19 are cross-sectional views of a molding tool with a foamable material expanded in an illustrative embodiment.
Figure 19:
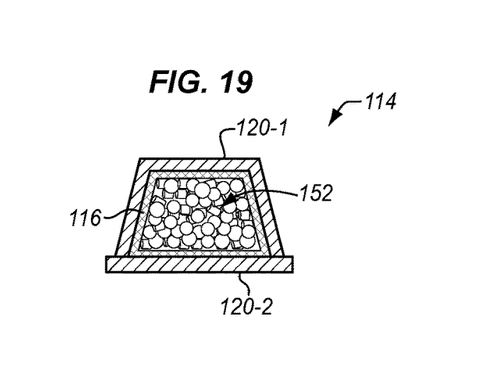

Prior to or concurrent with curing, the foamable material 132 is activated to expand into an expanded material 152 within constrained space 124 (step 1506 of FIG. 15). Foamable material 132 may be activated by heat, by a chemical reaction, or by another stimulus or trigger condition. For example, foamable material 132 may be heated (optional step 1520) before curing or during curing to cause expansion. FIGS. 18-19 are cross-sectional views of molding tool 114 with foamable material 132 expanded in an illustrative embodiment. The view in FIG. 18 is along cut plane 6-6 in FIG. 2, and the view in FIG. 19 is along cut plane 7-7 in FIG. 2. As foamable material 132 expands into the expanded material 152, it presses layup 116 against the forming surface(s) 122 of molding tool 114 (see also, FIG. 2) and acts to clamp layup 116 against molding tool 114. Expanded material 152 is designed to hold layup 116 in a specific shape until matrix material in layup 116 has cured.

In FIG. 15, method 1500 further includes curing the layup 116 while the expanded material 152 presses layup 116 against the forming surface(s) 122 of molding tool 114 to form a composite part 150 (step 1508). For example, oven 142 may heat layup 116 for curing (optional step 1522), autoclave 144 may heat layup 116 for curing (optional step 1524), or layup 116 may be cured via application of heat from another source. While being cured, the expanded material 152 acts to clamp layup 116 against molding tool 114 so that layup 116 accurately conforms to the forming surface(s) 122 of molding tool 114 when forming composite part 150.

Figure 20:
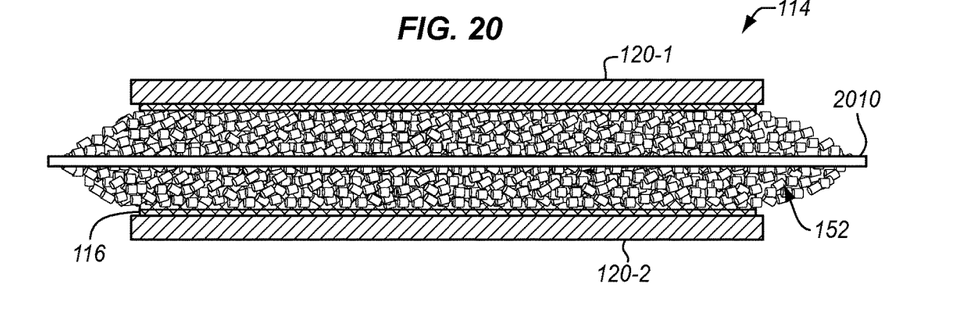
FIGS. 20-21 are cross-sectional views of a molding tool with a hole bored through expanded material in an illustrative embodiment.
Figure 21:
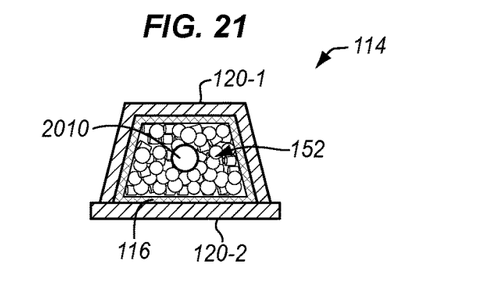
Figure 22:
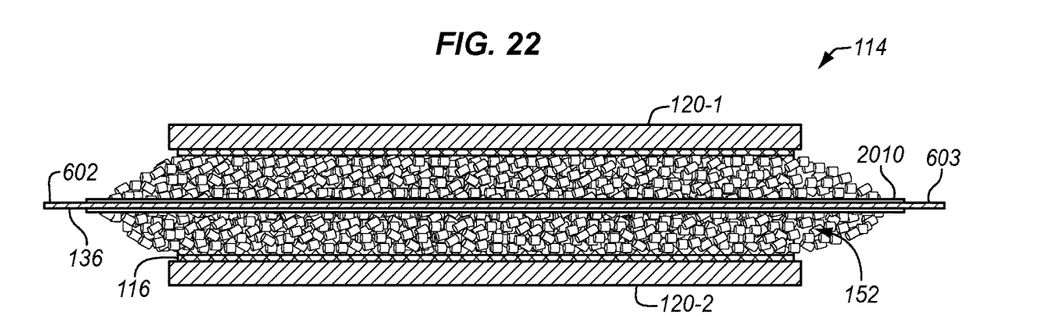
FIGS. 22-23 are cross-sectional views of a molding tool with a cutting wire threaded through a hole in an illustrative embodiment.
Figure 23:
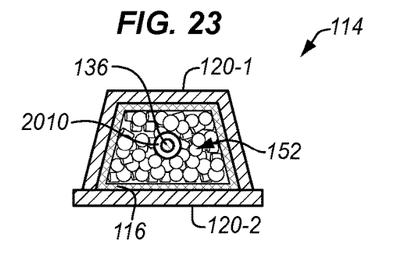

After curing, the expanded material 152 may be tightly compacted in constrained space 124 and difficult to remove. To remove the expanded material 152, method 1500 includes boring a hole through the expanded material 152 after curing (step 1510). FIGS. 20-21 are cross-sectional views of molding tool 114 with a hole 2010 bored through the expanded material 152 in an illustrative embodiment. The view in FIG. 20 is along cut plane 6-6 in FIG. 2, and the view in FIG. 21 is along cut plane 7-7 in FIG. 2. Drill 166, for example, may be used to bore a hole 2010 through the expanded material 152. Drill 166 may bore a hole 2010 with a rotating bit, by extending a heated bit through the expanded material 152, or through another means. In this embodiment, hole 2010 is formed completely through the expanded material 152 from one end to another. In FIG. 15, method 1500 further includes threading a cutting wire 136 through hole 2010 (step 1512). FIGS. 22-23 are cross-sectional views of molding tool 114 with a cutting wire 136 threaded through hole 2010 in an illustrative embodiment. The view in FIG. 22 is along cut plane 6-6 in FIG. 2, and the view in FIG. 23 is along cut plane 7-7 in FIG. 2. Manipulator 160, for example, may push or pull cutting wire 136 through hole 2010. When threaded through hole 2010, cutting wire 136 is disposed within constrained space 124 and through a length of the expanded material 152 so that ends 602-603 of cutting wire 136 are exposed.

Figure 24:
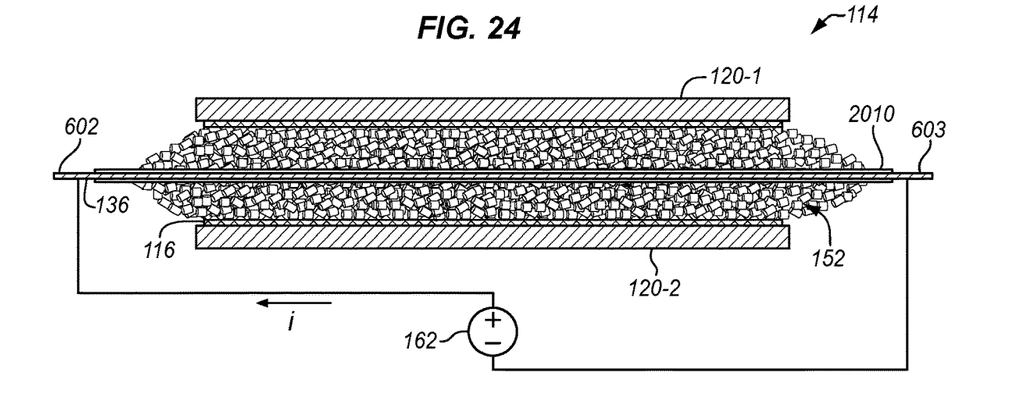
FIG. 24 is a cross-sectional view of a molding tool with a cutting wire being heated in an illustrative embodiment.

In FIG. 15, method 1500 further includes heating the cutting wire 136 (step 1514). For example, power supply 162 may apply a current through cutting wire 136 to increase the temperature of cutting wire 136 (optional step 1526). FIG. 24 is a cross-sectional view of molding tool 114 with cutting wire 136 being heated in an illustrative embodiment. The view in FIG. 24 is along cut plane 6-6 in FIG. 2. Although not shown, manipulator 160 may grasp ends 602-603 of cutting wire 136 with end effectors that make an electrical coupling with cutting wire 136. Power supply 162 may then apply the voltage across cutting wire 136 through the electrical coupling provided by manipulator 160.

Figure 25:
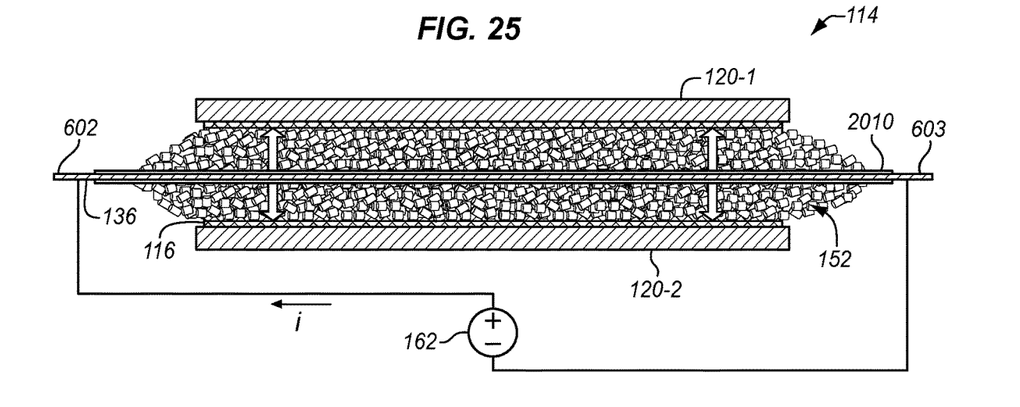
FIGS. 25-28 are cross-sectional views of a molding tool with a cutting wire being moved in illustrative embodiments.
Figure 26:
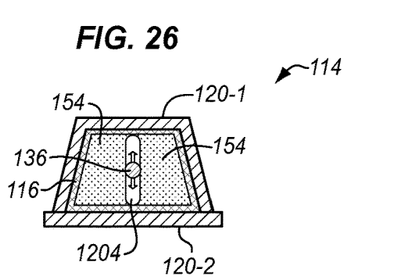
Figure 27:
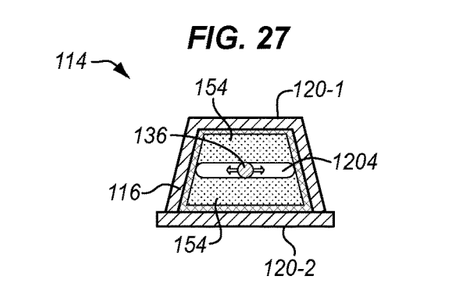
Figure 28:
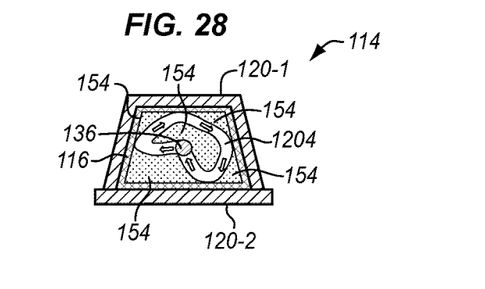

In FIG. 15, method 1500 further includes moving cutting wire 136 to cut the expanded material 152 into pieces 154 (step 1516). FIGS. 25-28 are cross-sectional views of molding tool 114 with cutting wire 136 being moved in illustrative embodiments. The view in FIG. 25 is along cut plane 6-6 in FIG. 2, and the views in FIGS. 26-28 are along cut plane 7-7 in FIG. 2. Cutting wire 136 may be moved, such as with manipulator 160, from one side of constrained space 124 to another to cut the expanded material 152 into pieces 154. As illustrated in FIG. 26, cutting wire 136 may be moved in an upward and/or downward motion to cut a groove 1204 through the expanded material 152. As illustrated in FIG. 27, cutting wire 136 may be moved in a side-to-side motion to cut a groove 1204 through the expanded material 152. As illustrated in FIG. 28, cutting wire 136 may be moved in a pattern to cut a groove 1204 through the expanded material 152. Therefore, cutting wire 136 is used like a hot knife in this embodiment to cut one or more grooves 1204 into the expanded material 152, and segment the expanded material 152 into pieces 154.

In FIG. 15, method 1500 further includes removing pieces 154 of the expanded material 152 from constrained space 124 (step 1518). For example, manipulator 160 may grasp pieces 154 of the expanded material 152, and pull the pieces 154 from constrained space 124. In another embodiment, vacuum device 164 may apply suction to remove the pieces 154 of the expanded material 152 from constrained space 124. Other techniques may be used to remove the pieces 154 from constrained space 124 so that composite part 150 and/or molding tool 114 are free from remnants of the expandable tooling 128 that was used to form composite part 150.

Figure 29:
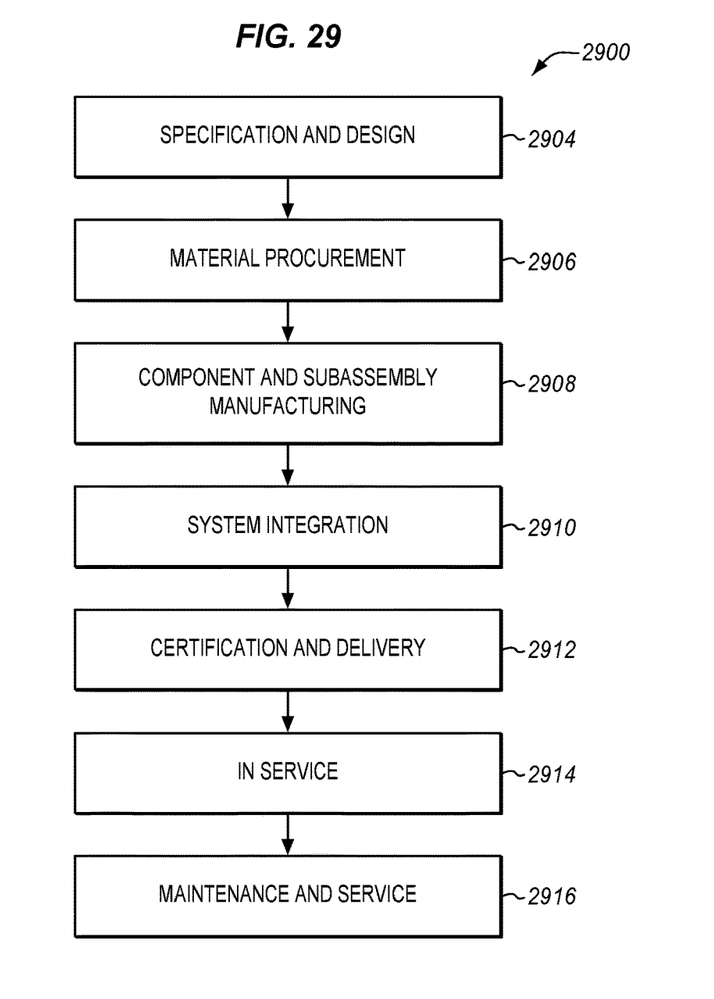
FIG. 29 is a flow chart illustrating an aircraft manufacturing and service method in an illustrative embodiment.
Figure 30:
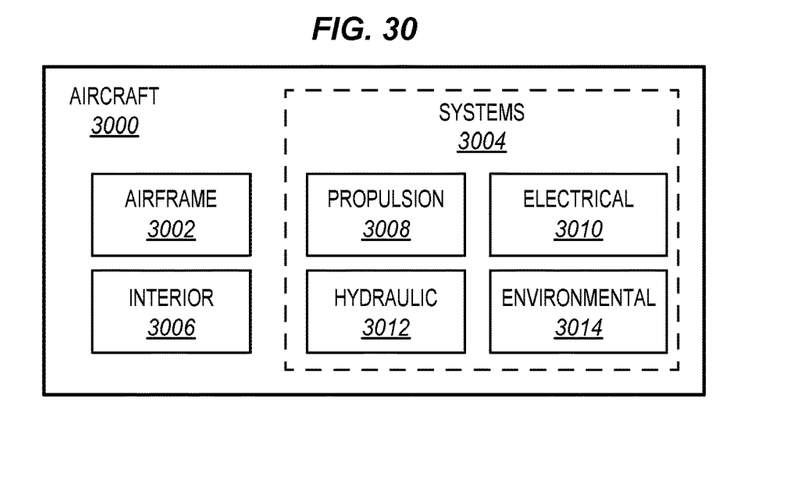
FIG. 30 is a schematic diagram of an aircraft in an illustrative embodiment

The embodiments of the disclosure may be described in the context of an aircraft manufacturing and service method 2900 as shown in FIG. 29 and an aircraft 3000 as shown in FIG. 30. During pre-production, exemplary method 2900 may include specification and design 2904 of aircraft 3000, and material procurement 2906. During production, component and subassembly manufacturing 2908 and system integration 2910 of aircraft 3000 takes place. Thereafter, aircraft 3000 may go through certification and delivery 2912 in order to be placed in service 2914. While in service by a customer, aircraft 3000 is scheduled for routine maintenance and service 2916 (which may also include modification, reconfiguration, refurbishment, and so on).

Each of the processes of method 2900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 30, aircraft 3000 produced by exemplary method 2900 may include an airframe 3002 with a plurality of systems 3004 and an interior 3006. Examples of high-level systems 3004 include one or more of a propulsion system 3008, an electrical system 3010, a hydraulic system 3012, and an environmental system 3014. Any number of other systems may be included. Although an aerospace example is shown, the principles described in this specification may be applied to other industries, such as the automotive industry.

Apparatus and methods embodied herein may be employed during any one or more of the stages of the production and service method 2900. For example, components or subassemblies corresponding to production process 2908 may be fabricated or manufactured in a manner similar to components or subassemblies produced while aircraft 3000 is in service. Also, one or more apparatus embodiments, method embodiments, or a combination thereof may be utilized during the production stages 2908 and 2910, for example, by substantially expediting assembly of or reducing the cost of aircraft 3000. Similarly, one or more of apparatus embodiments, method embodiments, or a combination thereof may be utilized while aircraft 3000 is in service, for example and without limitation, to maintenance and service 2916.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. A method of fabricating a composite part, the method comprising:
placing one or more composite layers on a molding tool to form a layup, wherein at least a portion of the layup is within a constrained space;
inserting a foamable material in the constrained space;
embedding a cutting wire in the constrained space before curing;
activating the foamable material to expand into an expanded material within the constrained space;
curing the layup while the expanded material presses the layup against the molding tool to form the composite part;
heating the cutting wire after curing;
moving the cutting wire to cut the expanded material into pieces; and
removing the pieces from the constrained space.

2. The method of claim 1 wherein activating the foamable material comprises:
heating the foamable material.

3. The method of claim 1 wherein heating the cutting wire comprises:
applying a current through the cutting wire.

4. The method of claim 1 wherein moving the cutting wire comprises:
moving the cutting wire within the constrained space with a manipulator.

5. The method of claim 4 wherein heating the cutting wire comprises:
applying a current through the cutting wire with end effectors of the manipulator.

6. The method of claim 4 wherein removing the pieces from the constrained space comprises:
grasping the pieces with the manipulator; and
pulling the pieces from the constrained space with the manipulator.

7. The method of claim 1 wherein:
the foamable material comprises foamable pellets.

8. The method of claim 1 wherein removing the pieces from the constrained space comprises:
applying suction with a vacuum device to remove the pieces.

9. The method of claim 1 wherein:
the composite part is manufactured for an aircraft.

10. A method of fabricating a composite part, the method comprising:
placing composite layers on a molding tool to form a layup, wherein at least a portion of the layup is within a constrained space created by a shape of the molding tool;
inserting a foamable material in the constrained space with the layup disposed between the foamable material and forming surfaces of the molding tool;
embedding, before curing the layup, a cutting wire along with the foamable material within the constrained space;
heating the molding tool and the layup in a curing device, wherein the heating activates the foamable material to expand within the constrained space into an expanded material that presses the layup against the forming surfaces of the molding tool, and cures the layup to form the composite part;
heating the cutting wire after curing;
moving the cutting wire while heated within the constrained space to cut the expanded material into pieces; and
removing the pieces from the constrained space.

11. The method of claim 10 wherein heating the molding tool and the layup comprises:
heating the molding tool and the layup in an oven.

12. The method of claim 10 wherein heating the molding tool and the layup comprises:
heating the molding tool and the layup in an autoclave.

13. The method of claim 10 wherein moving the cutting wire comprises:
moving the cutting wire within the constrained space with a manipulator.

14. The method of claim 13 wherein heating the cutting wire comprises:
applying a current through the cutting wire with end effectors of the manipulator.

15. The method of claim 13 wherein removing the pieces from the constrained space comprises:
grasping the pieces with the manipulator; and
pulling the pieces from the constrained space with the manipulator.

16. A method of fabricating a composite part, the method comprising:
placing composite layers on a molding tool to form a layup, wherein at least a portion of the layup is within a constrained space created by a shape of the molding tool;

inserting a foamable material in the constrained space with the layup disposed between the foamable material and forming surfaces of the molding tool;

embedding, before curing the layup, a cutting wire along with the foamable material within the constrained space;

activating, before curing the layup, the foamable material to expand within the constrained space into an expanded material that presses the layup against the forming surfaces of the molding tool;

curing the layup to form the composite part;

heating the cutting wire after curing;

moving the cutting wire while heated within the constrained space to cut the expanded material into pieces; and removing the pieces from the constrained space.

17. The method of claim 16 wherein activating the foamable material comprises:

activating the foamable material by a chemical reaction.

18. The method of claim 16 wherein moving the cutting wire comprises:

moving the cutting wire within the constrained space with a manipulator.

19. The method of claim 18 wherein heating the cutting wire comprises:

applying a current through the cutting wire with end effectors of the manipulator.

20. The method of claim 18 wherein removing the pieces from the constrained space comprises:

grasping the pieces with the manipulator; and pulling the pieces from the constrained space with the manipulator.

* * * * *